US011345078B2

(12) United States Patent
Van Heck et al.

(10) Patent No.: US 11,345,078 B2
(45) Date of Patent: May 31, 2022

(54) CONTAINER SLEEVING DEVICE, SYSTEM AND METHOD

(71) Applicant: Fuji Seal International, Inc., Osaka (JP)

(72) Inventors: Marinus Antonius Leonarda Van Heck, Haarsteeg (NL); Frederik Gerardus Heeman, Venlo (NL); Jeroen Gerrit Anton Gebbink, Helmond (NL)

(73) Assignee: Fuji Seal International, Inc., Osaka (JP)

( * ) Notice: Subject to any disclaimer, the term of this patent is extended or adjusted under 35 U.S.C. 154(b) by 227 days.

(21) Appl. No.: 16/094,690

(22) PCT Filed: Apr. 19, 2017

(86) PCT No.: PCT/NL2017/050249
§ 371 (c)(1),
(2) Date: Oct. 18, 2018

(87) PCT Pub. No.: WO2017/183973
PCT Pub. Date: Oct. 26, 2017

(65) Prior Publication Data
US 2019/0118461 A1    Apr. 25, 2019

(30) Foreign Application Priority Data

Apr. 19, 2016 (NL) .................................... 2016634
May 11, 2016 (NL) .................................... 2016758
Jan. 6, 2017 (NL) .................................... 2018140

(51) Int. Cl.
*B65B 9/14*    (2006.01)
*B29C 63/42*   (2006.01)
(Continued)

(52) U.S. Cl.
CPC .............. *B29C 63/426* (2013.01); *B65B 9/14* (2013.01); *B65B 21/245* (2013.01); *B65B 41/16* (2013.01);
(Continued)

(58) Field of Classification Search
CPC ........ B29C 63/423; B29C 63/426; B65B 9/14
See application file for complete search history.

(56) References Cited

U.S. PATENT DOCUMENTS

| 4,016,704 A | 4/1977 | Fujio |
| 8,146,333 B2 * | 4/2012 | Fresnel ..................... B65B 9/14 53/585 |
| 2013/0118119 A1 * | 5/2013 | Heeman ................ B29C 63/423 53/399 |

FOREIGN PATENT DOCUMENTS

| EP | 2104604 A1 | 9/2009 |
| EP | 2300216 A1 | 3/2011 |

OTHER PUBLICATIONS

"International Application Serial No. PCT/NL2017/050249, International Preliminary Report on Patentability dated Jun. 7, 2018", (dated Jun. 7, 2018), 10 pgs.
(Continued)

*Primary Examiner* — Scott W Dodds
(74) *Attorney, Agent, or Firm* — Schwegman Lundberg & Woessner, P.A.

(57) ABSTRACT

The present disclosure relates to a container sleeving device, system and method for arranging sleeves on a plurality of containers, wherein the sleeves are made of tubular foil material made to pass over the circumferential outer surface of a spreading element, the container sleeving device comprising:—a spreading element configured to spread open the tubular foil material passing from a proximal spreading element portion (31) towards a distal spreading element portion (34);—a cutting unit (25) for cutting the spread-open
(Continued)

Figure 1:
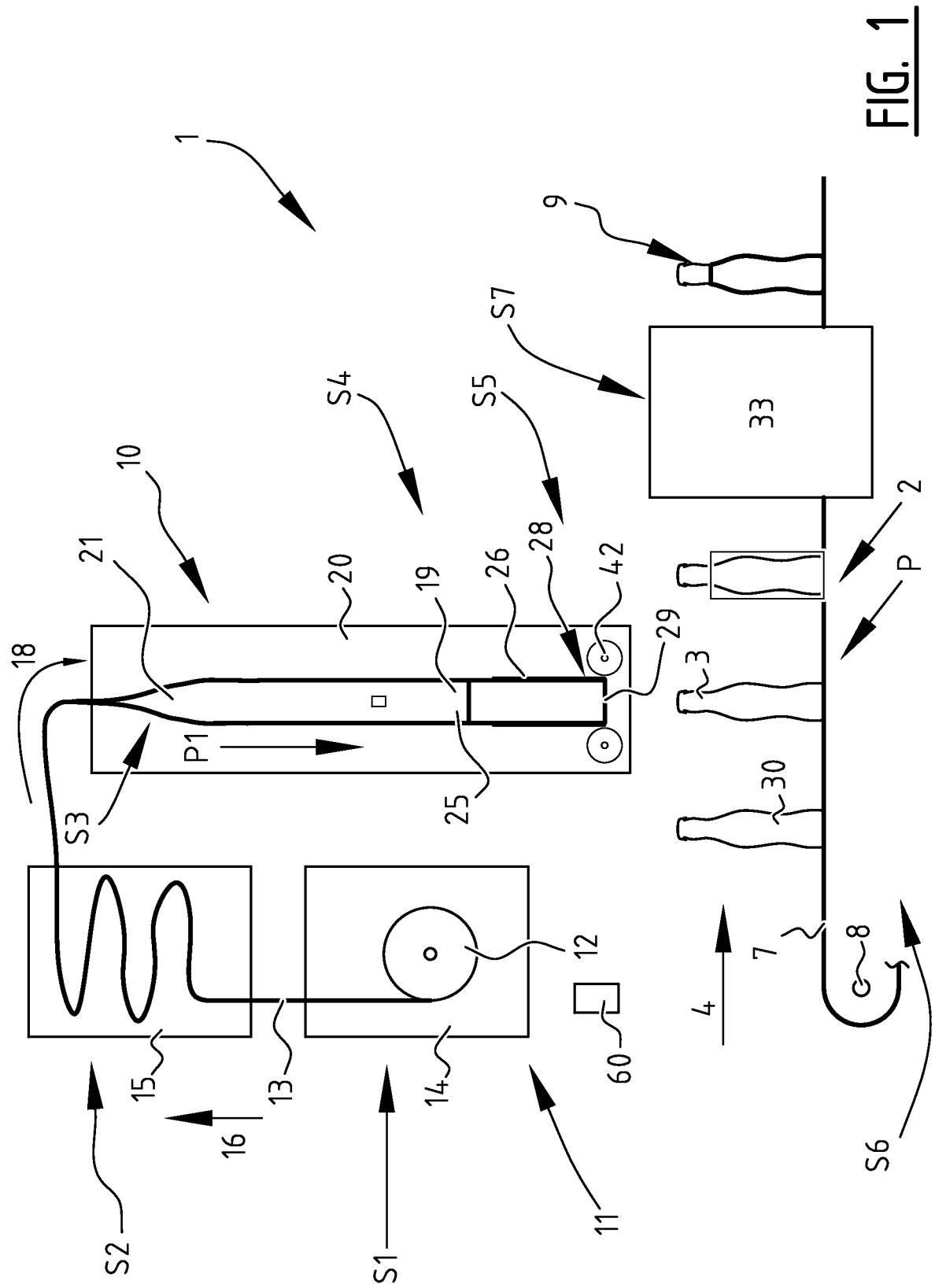

tubular foil material to form a sleeve;—a sleeve discharge unit (28) configured to accelerate the sleeve to move over the outer surface of the distal spreading element portion so as to discharge the sleeve towards a container; wherein the distal spreading element portion and/or the proximal spreading element portion has one or more pressure regulating openings configured to regulate the pressure close to the outer surface of the distal spreading element portion and/or of the proximal spreading element portion.

14 Claims, 6 Drawing Sheets

(51) Int. Cl.
   *B65C 3/06* (2006.01)
   *B65B 41/16* (2006.01)
   *B65B 21/24* (2006.01)
   *B65B 53/06* (2006.01)
   *B29L 31/00* (2006.01)

(52) U.S. Cl.
   CPC .............. *B65B 53/06* (2013.01); *B65C 3/065* (2013.01); *B29C 2793/0027* (2013.01); *B29L 2031/7158* (2013.01)

(56) References Cited

OTHER PUBLICATIONS

"International Application Serial No. PCT/NL2017/050249, International Search Report dated Sep. 4, 2017", (dated Sep. 4, 2017), 5 pgs.
"International Application Serial No. PCT/NL2017/050249, Written Opinion dated Sep. 4, 2017", (dated Sep. 4, 2017), 7 pgs.
"International Application Serial No. PCT/NL2017/050249, Written Opinion of the International Preliminary Examining Authority dated Sep. 4, 2017", (dated Mar. 8, 2018), 9 pgs.

* cited by examiner

SECTION B-B

SECTION C-C

SECTION D-D

CONTAINER SLEEVING DEVICE, SYSTEM AND METHOD

PRIORITY APPLICATIONS

This application is a U.S. National Stage Filing under 35 U.S.C. 371 from International Application No. PCT/NL2017/050249, filed on Apr. 19, 2017, and published as WO2017/183973 on Oct. 26, 2017, which claims the benefit of priority to Netherlands Application No. 2018140, filed on Jan. 6, 2017, which claims the benefit of priority to Netherlands Application No. 2016758, filed on May 11, 2016, which claims the benefit of priority to Netherlands Application No. 2016634, filed on Apr. 19, 2016; the benefit of priority of each of which is hereby claimed herein, and which applications and publication are hereby incorporated herein by reference in their entirety.

The present disclosure relates to a container sleeving method, container sleeving device and container sleeving system for arranging sleeves around a plurality of containers.

Such system, device and method are disclosed in, for example, the international publication WO 2011031160 A in the name of the same applicant. The sleeving system is aimed at arranging sleeves (labels) around containers, for instance food containers, bottles, bowls, holders, etc. in a fast and reliable manner by feeding a continuous strip of flattened tubular foil material wound around a foil supply reel towards a spreading element, transporting the foil material along the outer surface of the spreading element by a foil drive mechanism so as to open the foil material, cutting the foil material to form sleeves and discharging the sleeves from the spreading element towards a container passing by the spreading element while being transported on a conveyor. The sleeve is applied around the container and the container with the sleeve is transported to an oven in order to heat shrink the sleeve around the container.

A disadvantage of the known systems may be that they are less suitable for handling foil material that is relatively thin and/or relatively flexible or soft, at least if a high handling rate and a high sleeving reliability is required. For instance, when the thickness of the foil material is reduced to 20 µm or less, the sleeve sometimes has the tendency to jam on the spreading element, especially at the distal (discharge) end thereof. This is an undesirable situation.

It is an object of the present invention to provide a container sleeving device, container sleeving system and container sleeving method for arranging sleeves around a plurality of containers wherein the above-mentioned drawbacks are removed or at least reduced.

It is a further object of the present invention to provide such container sleeving device, container sleeving system and container sleeving method wherein very thin sleeves (for instance, sleeves with a thickness of typically 20 µm or less) may be arranged on containers in a fast and reliable manner.

According to a first aspect at least one of the objects is achieved in a container sleeving device for arranging sleeves on a plurality of containers, wherein the sleeves are made of tubular foil material made to pass over the circumferential outer surface of a spreading element, the container sleeving device comprising:
 a spreading element configured to spread open the tubular foil material passing from a proximal spreading element portion towards a distal spreading element portion;
 a cutting unit for cutting the tubular foil material to form a sleeve;
 a sleeve discharge unit configured to accelerate the sleeve to move over the outer surface of the distal spreading element portion so as to discharge the sleeve towards a container;
wherein the distal spreading element portion and/or the proximal spreading element portion has one or more pressure regulating openings configured to regulate the pressure close to the outer surface of the distal spreading element portion and/or proximal spreading element portion, respectively.

For instance, the inventors found to their surprise that the likelihood of a sleeve getting jammed on the distal portion of a spreading element may be reduced by providing the distal spreading element portion with one or more pressure regulating openings that are able to regulate the (local) pressure close to the outer surface of the distal spreading element portion. The openings enable the regulation of the pressure in the gap between the outer surface of the distal spreading element portion and the inner surface (i.e. the surface facing the distal spreading element portion) of a sleeving moving over the distal spreading element portion. Due to this pressure regulation the sleeve has a smaller tendency to be sucked towards the outer surface of the spreading element. This sucking effect may be caused by the (high velocity) movement of the sleeve along the (stationary) spreading element outer surface. The velocity difference between the sleeve and the spreading element in combination with the high flexibility of a very thin sleeve may cause the pressure on the inner side of the sleeve inside said gap to be lower than the pressure on the outside of the sleeve (Bernoulli-effect). On the outside of the sleeve an ambient pressure prevails (Bernoulli-effect). The resulting pressure difference would cause the sleeve to "adhere" to the outer surface of the spreading element or at least to move non uniformly over the spreading element towards the container. The pressure regulating openings may be configured to reduce this pressure difference so that the tendency of the sleeve to get jammed on the spreading element is reduced as well.

Air derived from a different position (for instance derived from an inlet at the bottom of the spreading element) may be supplied to the gap or space between a moving sleeve and the spreading element so that the pressure is locally increased. The openings may be radial openings extending in radial directions, so that air may be radially introduced into the gap as the sleeve advances past the openings. In embodiments of the present disclosure the openings debouche in one or more channels and/or cavities inside the spreading element which channels/cavities are in open (fluid) connection with the ambient air. Air may flow through the cavities and/or channels towards the openings and then into the gap between the circumferential outer surface of the distal spreading portion and the inner side of a sleeve moved along the distal spreading portion.

In a further embodiment the cavity may comprise one or more channels in open connection with the ambient air outside the container sleeving device and with the openings in the distal spreading element portion and/or the proximal spreading element portion. The central channel is configured to provide an open connection between the layer of air in the gap between the moving sleeve and the circumferential outer surface of the distal spreading element portion so that the low pressure as a result of the moving at high speed along the distal spreading element portion, is at least partially compensated.

In an embodiment the distal spreading element portion may comprise a cylindrical wall and/or the openings may be through-holes. Each of the through-holes then may debouch in the central cylinder cavity while the central cylinder cavity is in open connection with the ambient air.

The number of openings may vary depending on the requirements, for instance 20 or more. Preferably the openings are uniformly distributed over the circumferential outer surface of the distal spreading element portion so that the risk of the sleeve getting jammed locally or its movement at least partially hampered is reduced.

In case the pressure regulating openings are arranged in the proximal spreading element portion and when the proximal spreading element portion comprises a substantially diverging part, the at least one of the openings may be arranged in the substantially diverging part.

According to another aspect a container sleeving system for arranging sleeves on a plurality of containers is provided. The container sleeving system comprises at least one container sleeving device as defined herein and at least one of a stationary frame configured to suspend the at least one container sleeving device, a conveyor for transporting the containers. The conveyor may be configured to transport the containers consecutively along a shooting position at a distance from the sleeve discharge unit. The system may also comprise a sleeve supply configured to advance a sheath of foil material to at least a spreading element of the at least one container sleeving device.

According to another aspect a method of arranging sleeves on a plurality of containers is provided, the sleeves being made of tubular foil material shaped to pass over the circumferential outer surface of a spreading element of a sleeving device, the method comprising:
  advancing the tubular foil material over an outer surface of the spreading element from a proximal spreading element portion in an axial direction to a distal spreading element portion and thereby opening the tubular foil material;
  cutting the tubular foil material to form consecutive sleeves;
  successively accelerating the sleeves to move over the outer surface of the distal spreading element portion so as to discharge the sleeves towards the containers, wherein during moving the sleeves over the outer surface the sleeves are moved along a plurality of pressure regulating openings in the outer surface of the distal spreading element portion.

The cutting of the tubular foil material can be performed before advancing the tubular foil material over the spreading element and before spreading open the tubular foil material. In other embodiments the foil material is advanced (to some extent) over the spreading element so as to spread open the foil material and then the cutting is performed on the spread-open tubular foil material.

The method may further comprise reducing the difference between the ambient air pressure and the air pressure in the gap between the sleeve and the outer surface of the distal spreading element portion. Moving the sleeve over the outer surface of the distal spreading element portion involves moving the sleeve over a plurality of openings configured to reduce said pressure difference, as described above. The method may further involve guiding ambient air into at least a channel inside the distal spreading unit portion and from the at least a channel through at least one opening radially outwards.

Figure 2:
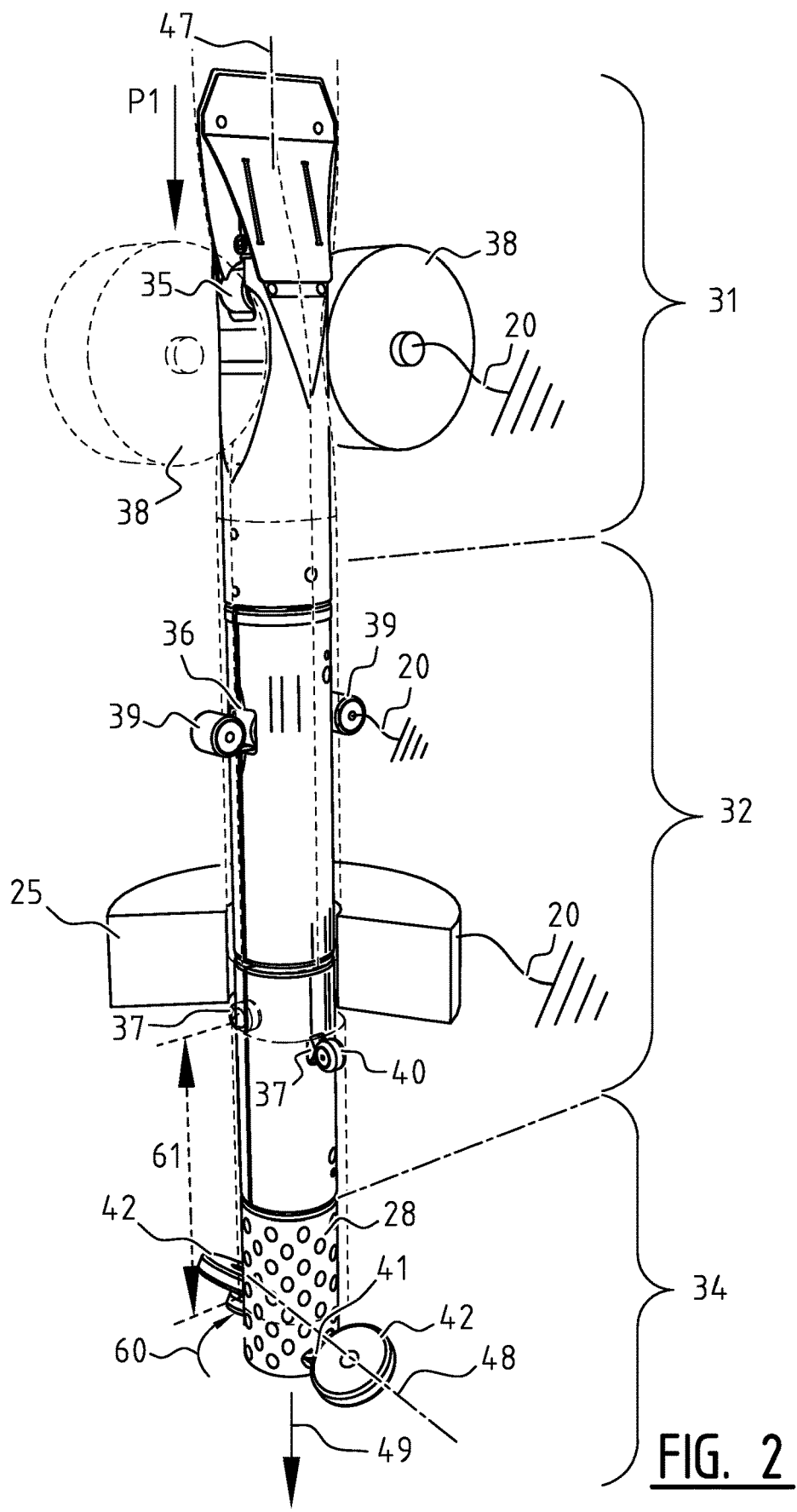
Figure 3:
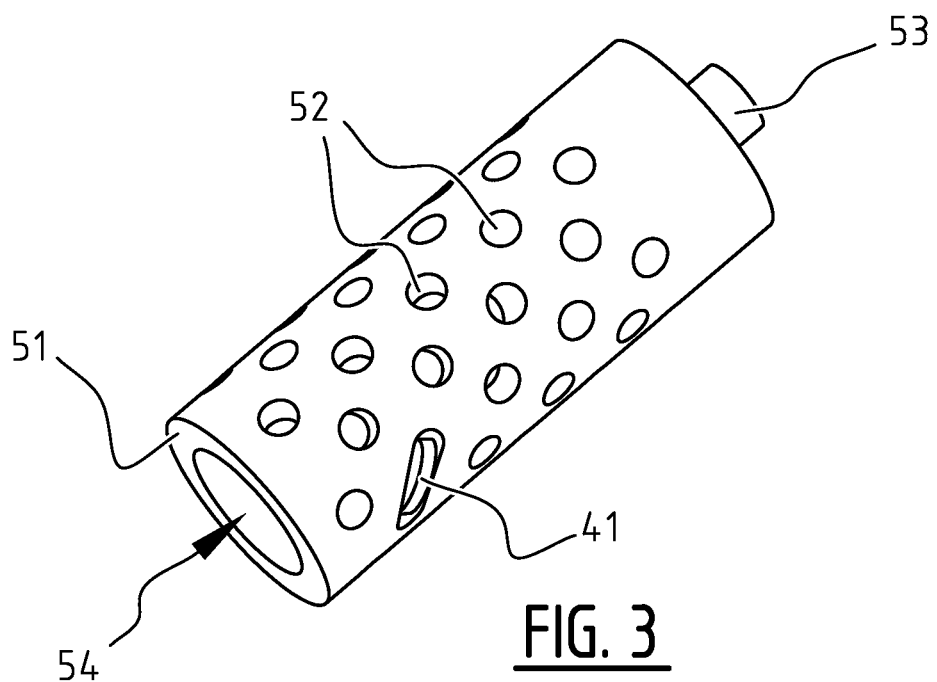
Figure 4:
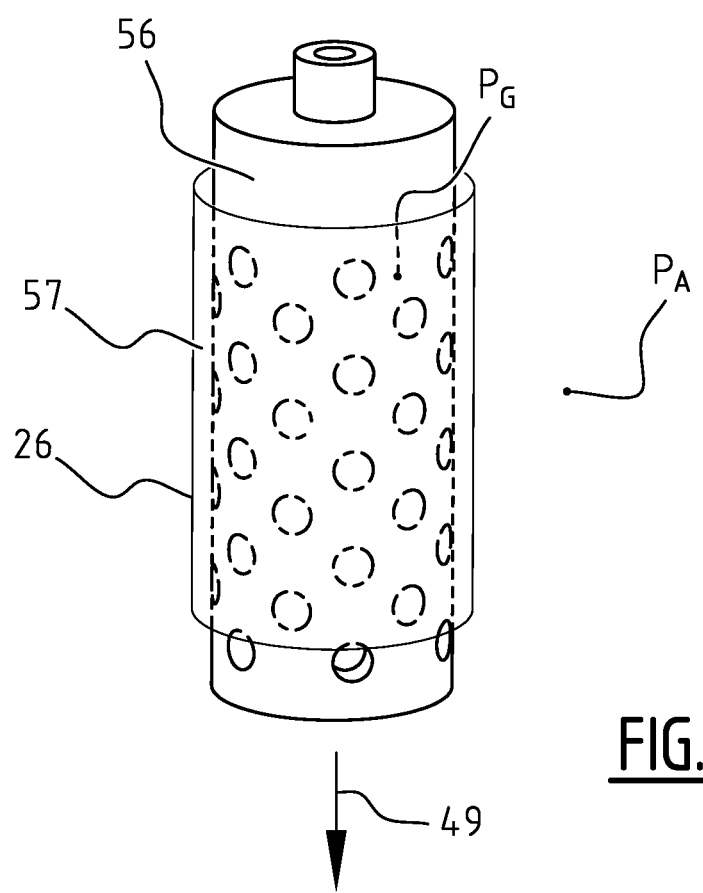
Figure 5:
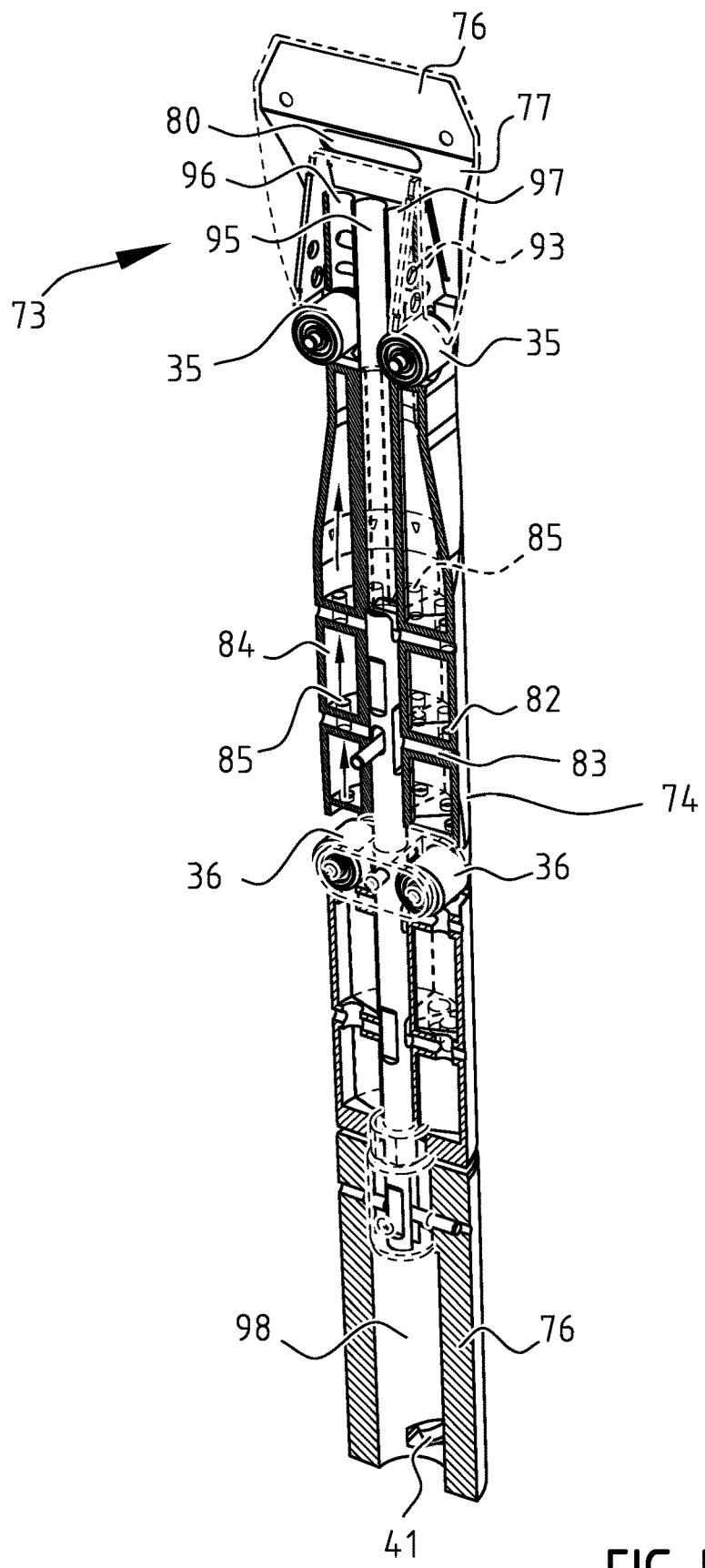
Figure 7A:
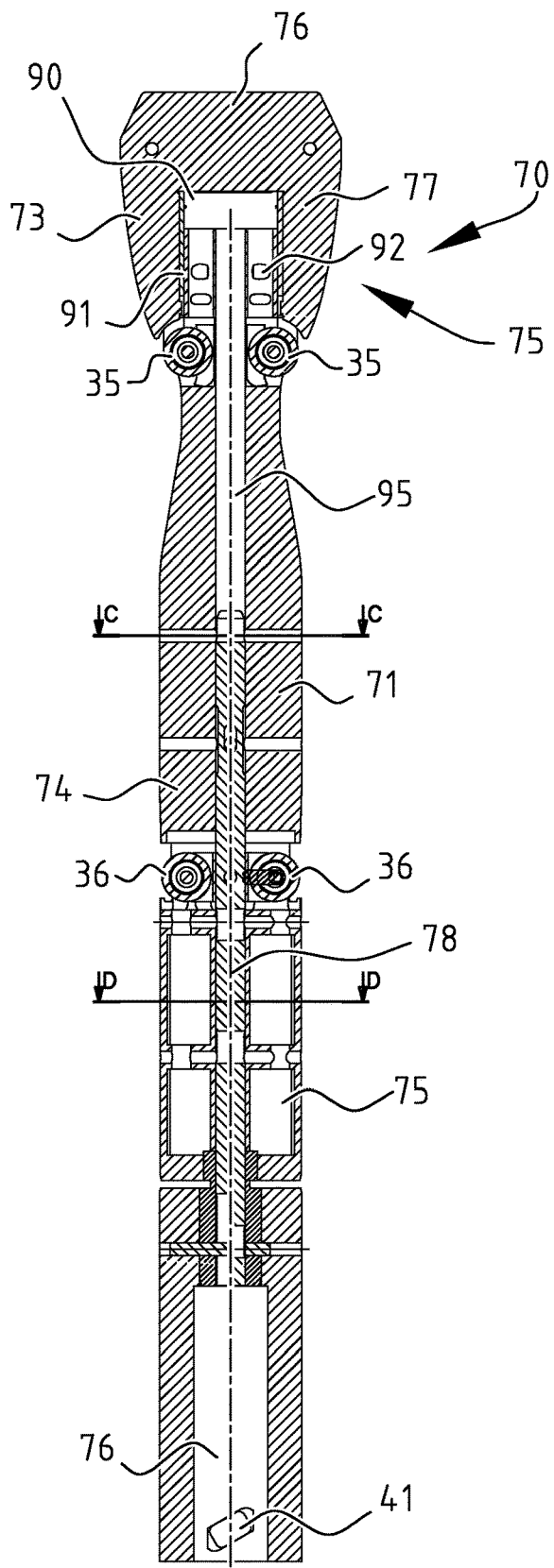
Figure 6:
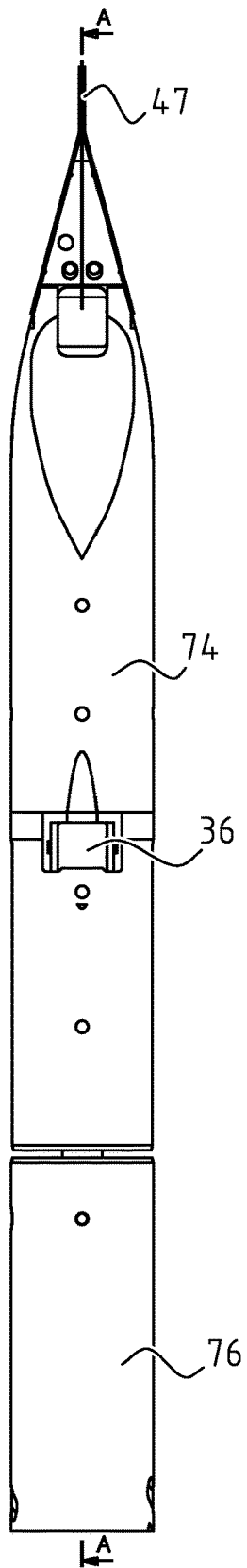
Figure 8:
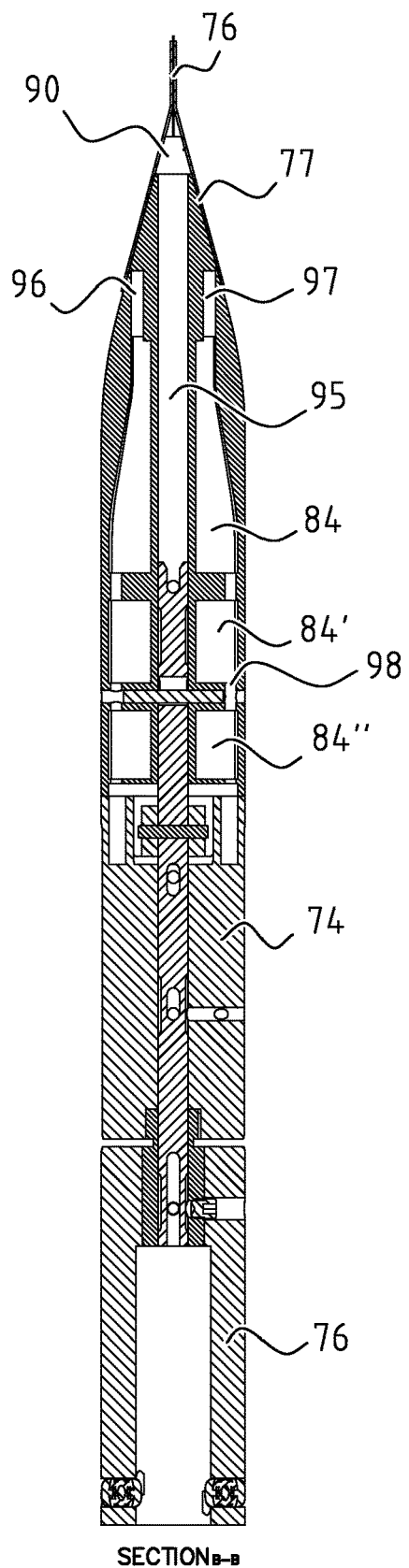
Figure 7B:
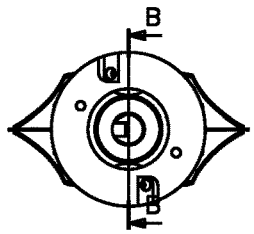
Figure 9:
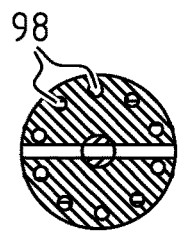

Further characteristics of the present invention will be elucidated in the accompanying description of various exemplary embodiments thereof, examples of which are illustrated in the accompanying drawings wherein like reference numerals refer to the like elements throughout. The figures show:

FIG. 1 a schematic overview of a container sleeving system according to an embodiment of the present invention;

FIG. 2 a schematic side view of an embodiment of a spreading element of a sleeving device, the spreading element having a distal spreading element portion according to an embodiment provided with pressure regulating openings;

FIG. 3 a schematic side view in perspective of the embodiment of the distal spreading element portion of FIG. 2;

FIG. 4 a schematic side view in perspective of the distal spreading element portion of the spreading element of FIG. 2, when a sleeve is moving downward over the circumferential outer surface of the distal spreading element portion;

FIG. 5 a partly taken-away view in perspective of a further embodiment of a part of the spreading element of a sleeving device, the spreading element having a proximal spreading element portion and an intermediate spreading element portion provided with pressure regulating openings;

FIG. 6 a side view of the further embodiment of the spreading element of FIG. 5;

FIG. 7A a longitudinal section along A-A of the further embodiment of FIGS. 5 and 6;

FIG. 7B a cross-section of the further embodiment of FIGS. 5 and 6;

FIG. 8 a cross-section along B-B of the further embodiment of FIGS. 5-7;

FIG. 9 a cross-section along C-C of the further embodiment of FIGS. 5-8; and

Figure 10:
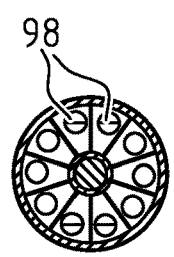

FIG. 10 a cross-section along D-D of the further embodiment of FIGS. 5-9.

Unless defined otherwise, all technical terms used herein have the same meaning as commonly understood by one of ordinary skill in the art to which this invention belongs. Still, certain elements are defined below for the sake of clarity and ease of reference. Furthermore it is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope of the present invention. Any recited method can be carried out in the order of events recited or in any other order which is logically possible.

FIG. 1 schematically shows an embodiment of a sleeving system 1 for sleeving (labeling) containers. The sleeving system 1 comprises a conveyor 2 (only partly shown in the figure) for conveying one or more parallel rows of containers 30, for instance food containers, bottles and the like, in a direction 4 along a sleeving position (P) at which sleeves are arranged around the containers. Embodiments of the conveyor may comprise an endless transport belt 7 to be conveyed by suitable wheels 8 in the direction 4. However, other types of conveyors may be employed as well. In fact, conveyor 2 may be any type of conveyor capable of transporting an array of containers along the sleeving position.

In the embodiment shown in FIG. 1 the containers 30 are arranged on top of the belt 7. The conveyor 2 may be configured to transport the containers 30 in a discontinuous manner (i.e. intermittently). In preferred embodiments, however, the conveyor is arranged to transport the containers in a continuous manner (i.e. non-intermittently). In these embodiments the operation of arranging of sleeves around the container is performed on the fly and essentially without interrupting the transport of the containers.

FIG. 1 also shows a stationary sleeving device 10 arranged above the sleeving position (P) and configured to arrange sleeves of foil material around containers transported by the conveyor 2. Sleeves are formed by cutting a continuous strip of foil material configured as a flattened tube or envelope at a suitable length. In the present application "sleeve" may be used as an indication for the individual pieces of foil that are arranged around products, but may equally well refer to the foil or strip forming a flattened or opened tube before it is cut.

Preferably the foil material is of a type that shrinks when it is subjected to a predefined physical phenomenon, for instance when it is subjected to heat. As explained later, the heat shrinkable foil may be applied around the container and then attached by heat-shrinking the foil onto the container.

FIG. 1 further shows a sleeve supply 11 for supplying a continuous strip of sleeve-like foil material 13 to the sleeving device 10. The sleeve supply 11 comprises a foil stock 14 in which one or more of supply reels 12 are arranged. On each of the supply reels 12 a continuous strip of sleeve-like foil material 13 has been wound. The strip of foil material can be transported towards the sleeving device 10 (direction 16) by any suitable means, for instance several sets of wheels or rollers (not specifically shown in the figures). The foil material of a selected one of the supply reels 12 is transported (S1) towards a foil buffer 15. The foil buffer is arranged to buffer (S2) the supplied foil material to allow for variations in operating speed of the supply without the need to interrupt the sleeving process. In an embodiment the foil stock 14 comprises a splicer (not shown) which is configured to connect a new strip of foil material from a further roll to the end of strip of foil material of an old reel to allow for a continuous feed of foil material to the sleeving device 10. Due to the splicer and the foil buffer 15 the supply of foil material to the sleeving device 10 can be essentially continuously (i.e. in an uninterrupted manner).

The supplied foil material 13, which has a flattened tubular shape, is caused to move (direction 18) along a spreading element 19, herein also referred to as the "mandrel" of the sleeving device 10. In the embodiment shown in FIGS. 1 and 2 the spreading element 19 is configured to first spread (S3) the flattened foil material to an "open" position and then to cut the foil material to a specific length so that foil material forms consecutive sleeves. In other embodiments the flattened foil material is first cut to a specific length to provide a sleeve and then advanced along the spreading element to open the sleeve. In each case a sleeve is sized to be arranged around the container 30 passing below the spreading unit 19. Securing the sleeve to the container may involve gluing or, preferably, a heat shrinking process.

As described above the sleeving device 10 comprises a spreading element 19 (which may be comprised of a plurality of parts). The spreading element 19 is suspended from a stationary frame 20 and is configured for spreading the strip of foil (which initially has a flattened tubular form) to an open position. To this end the spreading element 19 is provided with a spear or tip 21 shaped to open the foil 13 delivered as a flat envelop of foil material. For instance, the spear 21 may have a substantially flat cross section at the upstream end and more or less circular cross section at the downstream end thereof to bring the foil material to the desired tubular envelope or sleeve shape.

Sleeving device 10 further comprises a cutting unit 25 for cutting (S4) of sleeves from the opened foil material 13. The foil material may be guided past the cutting means unit for cutting the foil material at certain intervals so as to obtain individual sleeve-like foil envelopes or sleeves 26 of a suitable length. More specifically, the tubular foil material may be advanced over the spreading element and then stopped at a predetermined position such that the cutting device 25 may cut the foil material to realize a sleeve 26 having the required cutting length 61.

The sleeving device 10 also comprises a sleeve discharge unit 28, for instance comprising a pair of opposing inner guide wheels mounted at the distal end 29 of the spreading element 19 and a pair of outer drive wheels (which may be driven by a suitable electric motor, not shown in the figures) mounted at the frame 20, for shooting (S5) sleeves 26 cut from the strip of foil material towards the containers passing by the sleeving device. If the timing of discharging is correct and the containers are more or less aligned with the spreading element 19 the sleeves may be correctly arranged around the containers.

Once a sleeve 26 has been formed by the cutting unit 25, ejected (S5) towards the container 30 by the sleeve discharge unit 28 and arranged around the container by having the sleeve slide downwardly along the top end 3 of the container 30, the combination of sleeve 26 and container 30 is conveyed (S6) further in direction 4 by conveyor 2. Conveyor 2 transports the sleeved containers further downstream to a shrink unit 33 for attaching the sleeves around the containers by shrinking the same. For instance, the shrink unit 33 may be a heated steam oven wherein the sleeve 26 may be heat shrunk (S7) so that the sleeve 26 is permanently attached to the container 30, providing a labeled container 9. In a subsequent step a drying process may be applied.

FIG. 1 also shows a controller 60 that is configured to control the sleeving by the sleeving device 10, the transport by the conveyor 2 and the shrink-operation in the shrink unit 33. Advantages of a system set up according to FIG. 1 are high speed, accuracy, reliability and reduced gap. Not only sleeves are provided at high speed using the sleeve discharge unit, but also the heat shrinking in the oven is executed quickly, limiting the actual heating of the container that could already contain the product such as a dairy product.

FIG. 2 shows the sleeving device 10, especially the spreading element 19 or mandrel, in more detail. As mentioned above, the spreading element 19 is shaped so at to open the flattened foil material into a tubular envelope form. The proximal spreading element portion of the spreading element 19 (upper part 31 of the spreading element) has an essentially flat shape in cross-section, while for the intermediate spreading element portion 32 and the distal spreading element portion 34 the shape in cross-section is generally circular or oval. The spreading element 19 is suspended from the frame by a number of inner guide wheels in combination with a number of outer drive wheels mounted to the frame 20. In the specific arrangement of FIG. 2 the inner guide wheels of the sleeving device 10 comprise a set of upper guide wheels 35, a set of intermediate guide wheels 36 and a set of lower guide wheels 37, while the outer drive wheels comprise a set of upper drive wheels 38, intermediate drive wheels 39 and lower drive wheels 40. At least one of the drive wheels may be driven by drive motor (not shown), for instance a drive motor attached to the frame 20. Close to the distal end 29 of the spreading element 19 a set of inner discharge wheels 41 and a set of outer discharge wheels 42 are provided. The outer discharge wheels 42 are driven by one or more suitable drive motors (not shown) in order to accelerate the sleeve 26 positioned at the sleeve shot or distal spreading element portion 34 and throw the opened sleeve 26 towards a container 30 on the conveyor 2.

As shown in FIG. 2, the outer discharge wheels 42 and associated inner discharge wheels 41 may be oriented obliquely with respect to the axial direction 47 of the spreading element 19. For instance, the axis of rotation 48 of an outer discharge wheel 42 (and a corresponding axis of rotation of an inner discharge wheel 41) may be about 50° with respect to the axial direction 47, in order for the sleeve discharge unit 28 to engage the sleeve 26 and provide a linear motion (direction 49) combined with a rotational motion (direction 60) to the sleeve 26 when it is discharged towards a container. In other embodiments the outer drive wheels 42 are aligned with the axial direction 47 of the spreading element 19 (i.e. the axis of rotation 48 is perpendicular to the axial direction 47) so that no sleeve is only given a linear motion (downwards in case of downsleeving (direction $P_1$, FIG. 2) or upwards in case of upsleeving).

As shown in FIG. 2 and, in more detail, in FIG. 3, the distal spreading element portion 34 may comprise a cylindrical wall 51 in which a number of openings 52 have been provided. In the embodiment shown the openings 52 are radial through-openings in open connection with the cylindrical volume or cavity 53 positioned in the center of the distal spreading element portion 34 and being in open connection with the ambient air, for instance via the inlet at the bottom side of the cylinder. At the top portion of the distal spreading element portion 34 an axial attachment rod 53 is provided which can be slid into a corresponding receptacle (not shown) in the bottom to the intermediate portion 32 of the spreading element 19 in order to firmly attach the distal spreading element portion 34 to the remainder of the spreading element 19. Generally the distal spreading element portion 34 is shaped to provide a smooth transition between the intermediate portion 32 of the spreading element 19 and the distal spreading element portion 34, so that a sleeve travelling along the outer circumferential surface of the spreading element 19 is essentially not hampered in its movement.

Referring to FIG. 4, a possible explanation of the physical effects occurring during the movement of the sleeve along the distal spreading element portion 34 and the influence of the pressure regulating openings provided in the spreading element is given. As a sleeve 26 is travelling along the outer surface 56 of the cylindrical wall 51 of the distal spreading element portion 34 a boundary layer or gap 57 between the inner side of the sleeve 26 and the outer surface 56 of the spreading element exist. The air in this gap 57 appears to be entrained by the movement of the sleeve 26. This entrainment would result in air in the gap starting to move with a certain speed (velocity). This increase of the air velocity in the gap 57 (resulting in an increase of the dynamic pressure inside the gap, the increase being dependent on the velocity of the air) causes simultaneously a reduction of the static pressure $P_G$ in the gap 57 (according to Bernoulli's principle). The air surrounding the sleeve at the outer side is still at the ambient (air) pressure $P_A$. Consequently, the movement of the sleeve 26 causes a difference between the static pressure $P_G$ in the gap between the sleeve and the spreading element and the (static) ambient pressure $P_A$. Due to the difference in the ambient pressure $P_A$ and the static pressure $P_G$ in the boundary layer or gap 57 that would prevail when no openings 52 would have been available, a radially inward directed force caused by the Bernoulli effect may be exerted on the sleeve 26. This radial force may cause the sleeve 26, especially in case of ultra thin sleeves, for instance sleeves with a thickness of 20 μm or less, to get jammed on the distal spreading element portion 34. In order to avoid the sleeve to become jammed as it travels at high speed along the outer surface 56 of the distal spreading element portion 34, the openings 52 that are in connection with the internal volume 53 wherein the ambient pressure $P_A$ prevails, provide a flow of air in order to at least partly equalize the pressure difference between the pressure ($P_A$) outside the layer 57 and the pressure ($P_G$) inside the layer. In this manner the likelihood of the movement of the sleeve 26 to be impeded while it travels along the distal spreading element portion 34 or the sleeve to become jammed on the distal spreading element portion 34 may be reduced.

FIGS. 5-10 show a further embodiment of a sleeving device 70. Similar to the sleeving device 10 the present sleeving device comprises a stationary spreading element 71 arranged above a sleeving position (P, cf. FIG. 1). The sleeving device 70 is configured receive the supplied foil material 13, which has a flattened tubular shape, to open the flattened tubular foil material, to cut the opened tubular foil material into sleeves and to accelerate the sleeves towards containers passing on the conveyor 2. The stationary spreading element 71 of sleeving device 70 is comprised of a proximal spreading element portion 73 (in this case of downward sleeving an upper spreading element portion, in case of downward sleeving a lower spreading element portion), a distal spreading element portion 76 and an intermediate spreading element portion 74. Each of the proximal spreading element portion 73, intermediate spreading element portion 74 and distal spreading element portion 76 may comprise one or more separate modules wherein each module may perform one or more functions. For instance, the intermediate spreading element portion 74 may comprise a diaphragm portion 75, a cutter receiving portion, mounting pieces of upper guide wheels 35, intermediate guide wheels 36 and/or lower guide wheels 37, etc. The modules may be coaxially connected through a central connection hub 78.

The proximal spreading element portion 73 is shaped to open the foil 13 delivered as a flat envelop of foil material into a tubular envelope or sleeve shape. More specifically, the proximal spreading element portion 73 comprises a tip or spear 75 comprising a flat spear part 76 and a diverging spear part 77. The proximal end of the diverging spear part 77 has a substantially rectangular cross-section whereas the distal end of the diverging spear part 77 has a substantially cylindrical shape. In the diverging part 77 of the proximal spreading element portion 73 one or more slit-shaped openings 80 are provided, preferably one opening at the front side and one opening at the back side. The slit-shaped opening 80 connects to a central cavity 90 defined between two walls 91,92 extending in axial direction 47. In the walls 91,92 one or more further openings 93 may be arranged, which openings 93 are likewise in connection with the central cavity 90.

The central cavity 90 is in open connection with a central channel 95 and two side channels 95,96 (FIG. 5), each of the channels extending in axial direction. The central channel 95 connects to a central cavity 98 in the distal spreading element portion 76. The central cavity 98 is open at its distal side and therefore inside the central cavity 98 the ambient (exterior) air pressure prevails. Since the central cavity 90 in the proximal spreading element portion 73 is directly connected to the central cavity 98 in the distal spreading element portion 76, the slit-shaped opening(s) 80 may constitute one or more pressure-regulating openings for regulating the pressure close to the outer surface of the proximal spreading element portion when foil material is advanced along the spreading element. This pressure regulation may avoid or reduce problems such as jamming of the foil material (especially when the foil material is very thin) or a disturbed movement of the foil material along the spreading element outer surface.

Similarly, the side channels 96,97 may provide a connection with the ambient air pressure as well. As shown in FIG. 5, the spreading element 71 may comprise a tube formed by a tubular wall 82, wherein the interior of the tube is divided into compartments 84,84',84" using a number of partition walls 83 extending perpendicularly to the axial direction 47 of the spreading element. In the partition walls a number of channels 98 are formed so as to allow air to flow between the compartments from a region of ambient air pressure towards the cavity 90 at the proximal spreading element portion 73 and from the cavity through the pressure regulating openings 80,93 to the gap between the outer surface of the spreading element 71 and the inner surface of the foil material.

In the embodiment shown in FIGS. 5-10 the pressure regulating openings are provided in the proximal spreading element portion. The pressure regulating opening may be absent in the other portions (i.e. the intermediate spreading element portion and the distal spreading element portion). In other embodiments pressure regulating openings are formed in the distal spreading element portion as well, for instance similar to the openings described in connection with FIGS. 2-4. In still further embodiments the pressure regulating openings may have been provided in the proximal spreading element portion, the intermediate spreading element portion and the distal spreading element portion.

The present invention is not limited to the embodiments thereof described herein. The rights sought are defined by the following claims, within the scope of which numerous modifications can be envisaged.

The invention claimed is:

1. A container sleeving device for arranging sleeves on a plurality, of containers, wherein the sleeves are made of tubular foil material made to pass over a circumferential outer surface of a spreading element, the container sleeving device comprising:
   the spreading element configured to spread open the tubular foil material passing from a proximal spreading element portion towards a distal spreading element portion,
   a cutting unit for cutting the tubular foil material to form a sleeve;
   a sleeve discharge unit configured to accelerate the sleeve to move over the outer surface of the distal spreading element portion so as to discharge the sleeve towards a container, the sleeve discharge unit having discharge wheels oriented obliquely with respect to an axial direction of the spreading element;
   wherein the distal spreading element portion or the proximal spreading element portion has one or more air pressure regulating openings configured to regulate the air pressure close to the outer surface of the distal spreading element portion or proximal spreading element portion, respectively, wherein the air pressure regulating openings are connected to one or more channels, at least one channel coupled to a central cavity, the central cavity disposed axially at a center of the spreading element, the central cavity open to ambient air pressure so as to at least partially reduce the pressure difference between the pressure on the outer surface and the pressure on the inner surface of the sleeve.

2. The container sleeving device as claimed in claim 1, wherein a layer of air is formed between the inner surface of a sleeve and the outer surface of the distal spreading element portion or proximal spreading element portion when a sleeve is moved along the distal spreading element portion or proximal spreading element portion, respectively, and wherein the air pressure openings and channels are configured to partly or fully equalize the pressure difference between the pressure (PA) outside the layer and the pressure (PG) inside the layer.

3. The container sleeving device as claimed in claim 1, wherein the spreading element comprises an intermediate spreading element portion between the proximal and distal spreading element portions and wherein one or more further air pressure regulating openings are arranged in the intermediate spreading element portion.

4. The container sleeving device as claimed in claim 1, wherein the air pressure regulating openings are configured to at least partially reduce the pressure difference between the pressure on the outer surface and the pressure on the inner surface of the sleeve caused by Bernoulli's effect.

5. The container sleeving device as claimed in claim 1, the distal spreading element portion comprising a cavity connected to the air pressure regulating openings and to a region of ambient air pressure.

6. The container sleeving device as claimed in claim 5, wherein the cavity comprises one or more channels in open connection with the ambient air outside the container sleeving device and with the air pressure regulating openings in the distal spreading element portion or proximal spreading element portion.

7. The container sleeving device as claimed in claim 1, wherein the air pressure regulating openings are radial openings.

8. The container sleeving device as claimed in claim 1, wherein the proximal spreading element portion comprises a substantially diverging part, wherein at least one of the air pressure regulating openings is arranged in the substantially diverging part.

9. The container sleeving device as claimed in claim 8, comprising a plurality of air pressure regulating openings along the circumference of the diverging part, wherein the air pressure regulating openings are essentially evenly distributed over the circumference of the diverging part.

10. The container sleeving device as claimed in claim 1, wherein the distal spreading element portion comprises a cylindrical wall and wherein the air pressure regulating openings are through-holes, wherein an intermediate spreading element portion between the proximal and distal spreading element portions comprises air pressure regulating openings.

11. The container sleeving device as claimed in claim 1, wherein the number of air pressure regulating openings is larger than 20.

12. The container sleeving device as claimed in claim 1, wherein the air pressure openings are substantially uniformly distributed along the circumferential outer surface of the distal spreading element portion.

13. The container sleeving device as claimed in claim 1, wherein the sleeve discharge unit comprising a set of inner discharge wheels arranged at a discharge position in the wall of the distal spreading element portion and a set of outer discharge wheels mounted to a frame, wherein the inner and outer discharge wheels are arranged to engage a sleeve on the discharge position and shoot the sleeve towards a container so as to arrange the sleeve on the container.

14. The container sleeving device as claimed in claim 1, wherein the distal spreading element portion comprises a cylindrical wall along which the sleeve can be advanced, wherein the air pressure regulating openings in the cylindrical wall are configured to equalize the pressure outside and inside the spreading element.

\* \* \* \* \*